(12) United States Patent
Draber

(10) Patent No.: US 7,050,935 B1
(45) Date of Patent: May 23, 2006

(54) METHOD FOR ASSESSING THE RELIABILITY OF TECHNICAL SYSTEMS

(75) Inventor: Silke Draber, Bonn-Bad Godesberg (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 09/521,107

(22) Filed: Mar. 7, 2000

(30) Foreign Application Priority Data

Mar. 8, 1999 (DE) ................................ 199 10 098

(51) Int. Cl.
*G06F 17/00* (2006.01)

(52) U.S. Cl. .................... 702/181; 702/179; 702/185

(58) Field of Classification Search ............... 702/181, 702/33–36, 58, 59, 113–115, 179, 182–185, 702/187, 188, FOR 103, FOR 104, FOR 111, 702/FOR 112, FOR 139, FOR 123–FOR 125, 702/FOR 134–FOR 136, FOR 140, FOR 170, 702/FOR 171; 706/45, 60, 61, 920, 904–916, 706/932; 703/17, 18, 2, 4, 6, 13; 700/21, 700/79, 286, 36; 714/1, 25, 26; 705/400
See application file for complete search history.

(56) References Cited

U.S. PATENT DOCUMENTS

| | | | | |
|---|---|---|---|---|
| 5,014,220 A | * | 5/1991 | McMann et al. | 706/45 |
| 5,465,321 A | * | 11/1995 | Smyth | 706/20 |
| 5,548,539 A | | 8/1996 | Vlach et al. | 493/402 |
| 5,586,252 A | * | 12/1996 | Barnard et al. | 714/48 |
| 5,798,939 A | | 8/1998 | Ochoa et al. | 700/286 |
| 5,822,218 A | | 10/1998 | Moosa et al. | 716/4 |
| 5,991,707 A | * | 11/1999 | Searles et al. | 702/185 |
| 6,065,133 A | * | 5/2000 | Draber | 714/1 |

FOREIGN PATENT DOCUMENTS

| | | |
|---|---|---|
| DE | 195 07 134 C1 | 7/1996 |
| DE | 196 39 424 A1 | 3/1997 |
| DE | 197 13 917 A1 | 10/1998 |
| EP | 0494788 A1 | 7/1992 |

OTHER PUBLICATIONS

Translation of DE 196 39 424 A1, Germany, Mar. 27, 1997.*
Translation of DE 195 07 134 C1, Germany, Jul. 4, 1996.*
Translation of DE 197 13 917 A1, Germany, Oct. 8, 1998.*
Trnslation of Kochs, "Zuverlassigkeitsermittlung grosser und komplexer Systeme mit effizienten Naherungsverfahren", Automatisierungstechnik 43 (1995), pp. A1 to A4.*

(Continued)

*Primary Examiner*—Hal Wachsman
(74) *Attorney, Agent, or Firm*—Buchanan Ingersoll PC

(57) ABSTRACT

A method for quantitative estimation of the reliability of a technical system for complex systems with a multiplicity of components. First, second and third failure rates are distinguished for the system components. An upper, lower and, if appropriate, mean value are in each case estimated for the largely unknown second failure rates by subjective expert opinion, and all upper, lower and, if appropriate, a mean probability distribution and, if appropriate, a mean probability distribution of the system reliability. Systematic correlations between expert estimates are thereby taken into account. For the first failure rates, mean values obtained from operational experience are determined with a confidence interval, and widened Poisson distributions are calculated. Furthermore, it is possible to add to the overall probability of the system reliability the Poisson distribution of third types of fault whose failure rates are known a priori or with a high statistical reliability.

14 Claims, 2 Drawing Sheets

OTHER PUBLICATIONS

Translation of Grams, "Ein allgemeines Zuverlassigkeitsmodell mit Anwendungen", Automatisierungstechnik 45 (1997), pp. 378-385.*

T. Onisawa, "A Model of Subjective Reliability Analysis" XP-000910587, pp. 756-761, 1993. no month.

Qualitat und Zuverlassigkeit technischer Systeme, A. Birolini, 1985, pp. 366-367.

"Reliability Cost Estimation: Managerial Perspectives", Regulinski, et al., IEEE Transactions, 1983, p. 276-280, no month.

Hans-Dieter Kochs; "Zuverlassigkeitsermittlung grosser und komplexer Systeme mit effizienten Naherungsverfahren", Kochs, Automatisierungstechnik 43 (1995), p. A1 to A-4.

Timm Grams; "Ein allgemeines Zuverlassigkeitsmodell mit Anwendungen", Grams, Automatisierungstechnik 45 (1997), p. 378-385. no month.

* cited by examiner

METHOD FOR ASSESSING THE RELIABILITY OF TECHNICAL SYSTEMS

FIELD OF THE INVENTION

The present invention relates to the field of reliability analysis of technical systems.

BACKGROUND OF THE INVENTION

Such a method is known from the article by T. L. Regulinski and Y. P. Gupta, "Reliability Cost Estimation: Managerial Perspectives", IEEE Transactions on Reliability, Volume R-32, pages 276–281 (1983). A method is set forth there for estimating fault-induced costs in the life cycle of a system. Various failure probability distributions are postulated for the system components, depending on the fault mechanism, and their parameters are estimated statistically or by subjective expert opinion. An improved expert estimate is achieved by specifying an upper, mean and lower estimate for the failure rate and using them to determine a beta distribution of the failure rate. A unique cost estimate is calculated for the overall system from the beta distributions modeled in such a way. However, there is a problem that subjective estimates by one or a few experts lead to corrections between different failure rates, and the systematic falsification in an unknown way of the prediction of the system reliability.

Moreover, it is known that for types of fault with a constant fault rate the fault frequency, that is to say the randomness of the number of faults in a time interval, can be described by a Poisson distribution (see, for example, the textbook by A. Birolini, "Qualität und Zuverlässigkeit technischer Systeme" [Quality and Reliability of Technical Systems], Springer-Verlag Berlin (1991), page 366).

Furthermore, reliability analyses in tabular form under the terms of FMEA analysis ("Failure/Fault Modes and Effects Analysis") or FEMCA ("Failure/Fault Modes, Effects and Criticality Analysis") constitute prior art. The system components are listed in rows with their possible types of failure and the calculated or estimated failure rates and the susceptability to disruption of the overall system are assessed.

SUMMARY

The object of the present invention is to specify an improved method for estimating the reliability of a technical system.

The invention consists in that first types of fault with statistically known fault rates and second types of fault with largely unknown fault rates are distinguished for the components of a technical system, an upper and a lower subjective estimate being specified respectively for the latter fault rates, and a first limiting probability distribution being calculated for the system reliability with all the upper estimates and a second limiting probability distribution being calculated for the system reliability with all the lower estimates. Thus, approximate knowledge both of the fault rates and of the uncertainty of fault rate estimates is used to specify a conservative upper and lower limit of the system reliability.

The method according to the invention largely cuts back the influence of systematic faults on the calculation of the system reliability by treating the expert estimates as being intercorrelated.

In a first exemplary embodiment, a mean value is respectively estimated in addition for the second fault rates and used to calculate a mean probability distribution. By adding the individual failure probabilities and by convoluting their distributions, it is possible to specify a graphical representation of the mean, maximum and minimum system reliability for a prediction period. The graphical representation permits a simple, intuitive risk assessment for the probability of a system failure or a cost overrun owing to maintenance, standstill and repair of a technical system.

In a further exemplary embodiment, a Poisson distribution is assumed for each first type of fault, an upwardly and downwardly displaced limiting Poisson distribution is determined for a required confidence level, and a widened Poisson distribution of the first type of fault is determined by weighted summing of the three Poisson distributions.

Further embodiments, advantages and applications of the invention follow from the description now following with the aid of the figures.

BRIEF DESCRIPTION OF THE DRAWINGS

By way of example.

Identical parts are provided with identical reference symbols in the figures.

DETAILED DESCRIPTION OF THE PREFERRED EMBODIMENTS

The subject matter of the invention is a method for quantitative estimation of the reliability of a technical system. A system is understood to be in general terms an arbitrary machine or system, for example a turbine or a power plant, or a process for production or treatment. In this case, types of fault with associated fault rates are specified for the system components, and a probability distribution of a random variable characterizing the reliability is determined for the overall system and a prescribable time interval. First fault rates are determined by statistical random samples. Second fault rates are estimated by subjective expert opinion, an upper and a lower estimate being specified in each case. According to the invention, a first limiting probability distribution is calculated with the upper estimates, and a second limiting probability distribution is calculated with the lower estimates. Preferred exemplary embodiments are specified below.

Figure 1:
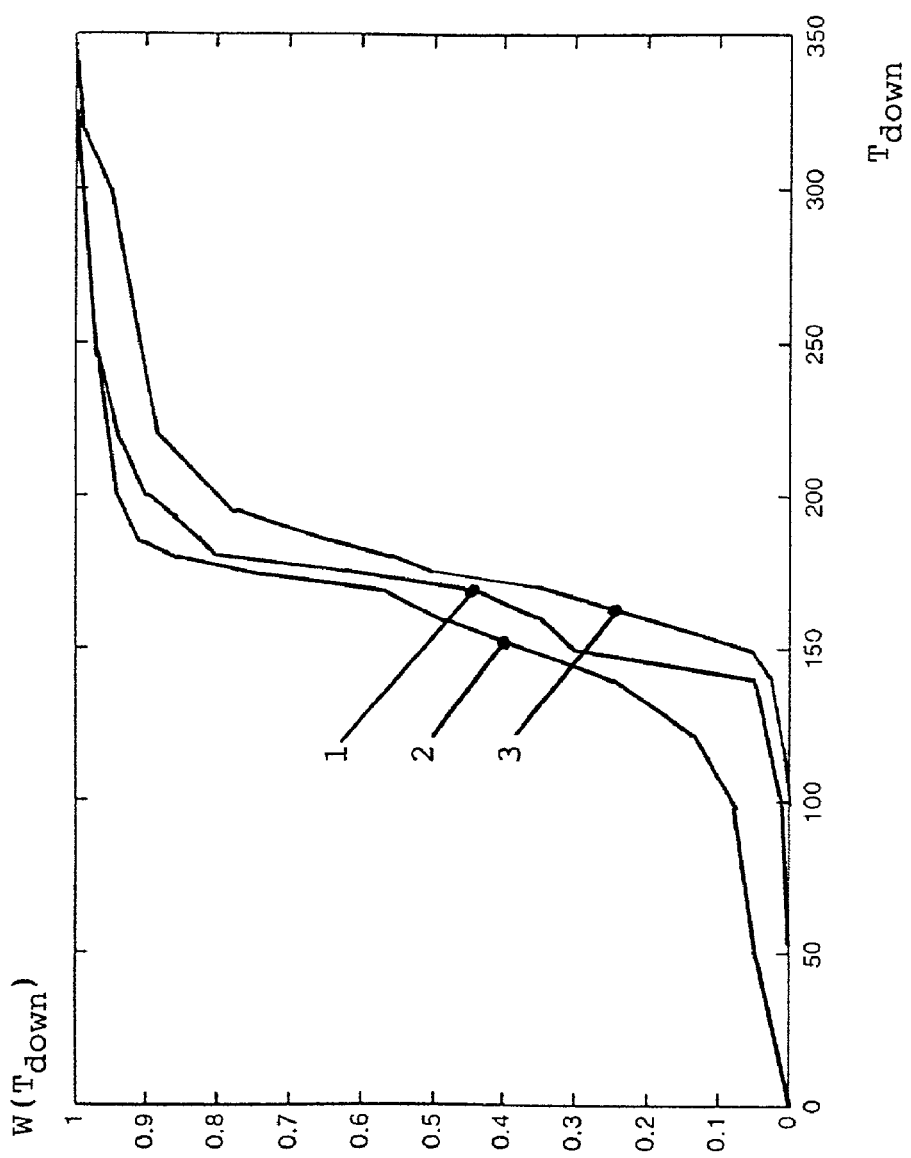
FIG. 1 shows a representation according to the invention for the predicted probability W of a downtime of less than or equal to $T_{down}$ (in hours) in the course of one year.

For the second fault rates, it is additionally possible to estimate a mean value in each case and to calculate a mean probability distribution with the mean values. The values presumed to be the most probable are preferably estimated as mean values. The result can be summarized and illustrated in the form of a graphical representation in accordance with FIG. 1. In the figure, a failure-induced downtime $T_{down}$ during a year in hours is selected as random variable, and three probability distributions $W(T_{down})$ 1, 2, 3 are specified for the failure-induced downtime being less than or equal to $T_{down}$. In this case, 2 denotes a first or optimistic, and 3 a second or pessimistic, limiting probability distribution, and 1 denotes a mean probability distribution.

The aim for the first fault rates is to determine random sample mean values and assume distribution functions, and to determine from the uncertainty of each random sample mean value a width or a widening of the associated distribution function. In particular, for each first type of fault, a Poisson distribution with a nominal expectation value equal to the random sample mean value is assumed, a minimum and a maximum expectation value are calculated from a required confidence level, and a widened Poisson distribution is calculated by weighted summing of the Poisson distributions with the nominal, minimum and maximum expectation values. According to the invention, a confidence level $1-\alpha$ and weighting factors $1-2\alpha$, $\alpha$ and $\alpha$ are selected for the Poisson distributions with the nominal, minimum and maximum expectation values. $\alpha$ is typically selected in the range between 0.05 and 0.3, and in particular $\alpha=0.1$.

The model according to the invention of a widened probability distribution serves the purpose of taking appropriate account of the uncertainty in the knowledge of the expectation value of the fundamental probability distribution by widening the probability distribution. A computational example is specified below for a Poisson distribution. It may be assumed as known from operational experience or the like that a system component has a total of $n_{stat}$ failures during one observation period $t_{stat}$. A nominal expectation value of the fundamental Poisson distribution is then given by $\mu_{nom}=n_{stat}/t_{stat}*T$, where T=time interval for the risk analysis or operating period of the overall system. Using a confidence level of, for example, $1-\alpha=0.9$, a lower and upper limit of a confidence interval is calculated for the expectation value using the following equations (after Koslow and Uschakow, Hanbuch zur Berechnung der Zuverlässigkeit für Ingenieure, [Engineer's manual for calculating reliability], page 426 (1979)): $\mu_{low}=n_{low}/t_{stat}*T$, $\mu_{up}=n_{up}/t_{stat}*T$, where $n_{low}=0.5*\chi^2[\alpha/2] (2n_{stat})$ and $n_{up}=0.5*\chi^2[1-\alpha/2] (2n_{stat}+2)$, where $\chi^2[1-\alpha/2](2n_{stat}+2)$ denote the (tabulated) $\chi^2$ quantiles. In a departure from a customary $\chi^2$ distribution, the factors 2 and 0.5 are determined by the Poisson distribution. The Poisson distributions with the expectation values $\mu_{low}$, $\mu_{nom}$ are added to the weighting factors 0.1; 0.8 and 0.1, and thus resulting in widening. According to the invention, the weighting factors for the two edge Poisson distributions are selected such that the sum of the components projecting upwards and downwards from the confidence interval (in each case, approximately half of the edge distributions) are exactly equal to the confidence level itself. The calculation of the Poisson widening is thereby largely self-consistent.

For a higher confidence level, the confidence interval is widened, the weighting factors for the edge distributions decrease, and the widening is dismninished. If the time interval T for the risk analysis is substantially longer than the observation time $t_{stat}$, three separate maxima occur in the widened Poisson distribution. However, it is desirable to obtain a monomodal widened Poisson distribution. The edge weighting factors can be selected to be larger or smaller for this purpose, and/or the number of the Poisson distributions to be weighted can be enlarged.

Furthermore, in order to improve the prediction of the system reliability or the system risk analysis, account is taken of third types of fault whose fault rates are known a priori or with high statistical reliability, and for which an ideal Poisson distribution is assumed. The distribution functions of the first and third fault rates are convoluted, and the first and second limiting probability distributions 2, 3 and, if appropriate, a mean probability distribution 1 are calculated by adding the upper, lower and, if appropriate, mean estimates of the second fault rates. In addition, other non-random variables relevant to the system reliability can be determined for the time interval and added to the probability distributions.

The random variable which characterizes the system reliability can be a susceptibility to faults, downtime, costs of standstill, repair and maintenance, or variables derived therefrom. The fault rates are typically failure rates of the system components.

Finally, there is an explanation of an application of the disclosed method in conjunction with FMEA ("Failure/Fault Modes and Effects Analysis") tables, FMECA ("Failure/Fault Modes, Effects and Criticality Analysis") tables, or tables derived therefrom. According to the invention, first, second and third fault rates are distinguished in the tables, random sample mean values and confidence intervals are specified for first fault rates, upper, lower and, if appropriate, mean estimates are specified for second fault rates, and expectation values are specified for third fault rates. In particular, Poisson distributions of the first and third types of fault are calculated and convoluted with one another, and the second fault rates are grouped into upper, lower and, if appropriate, mean fault rates and added separately in each case.

Figure 2:
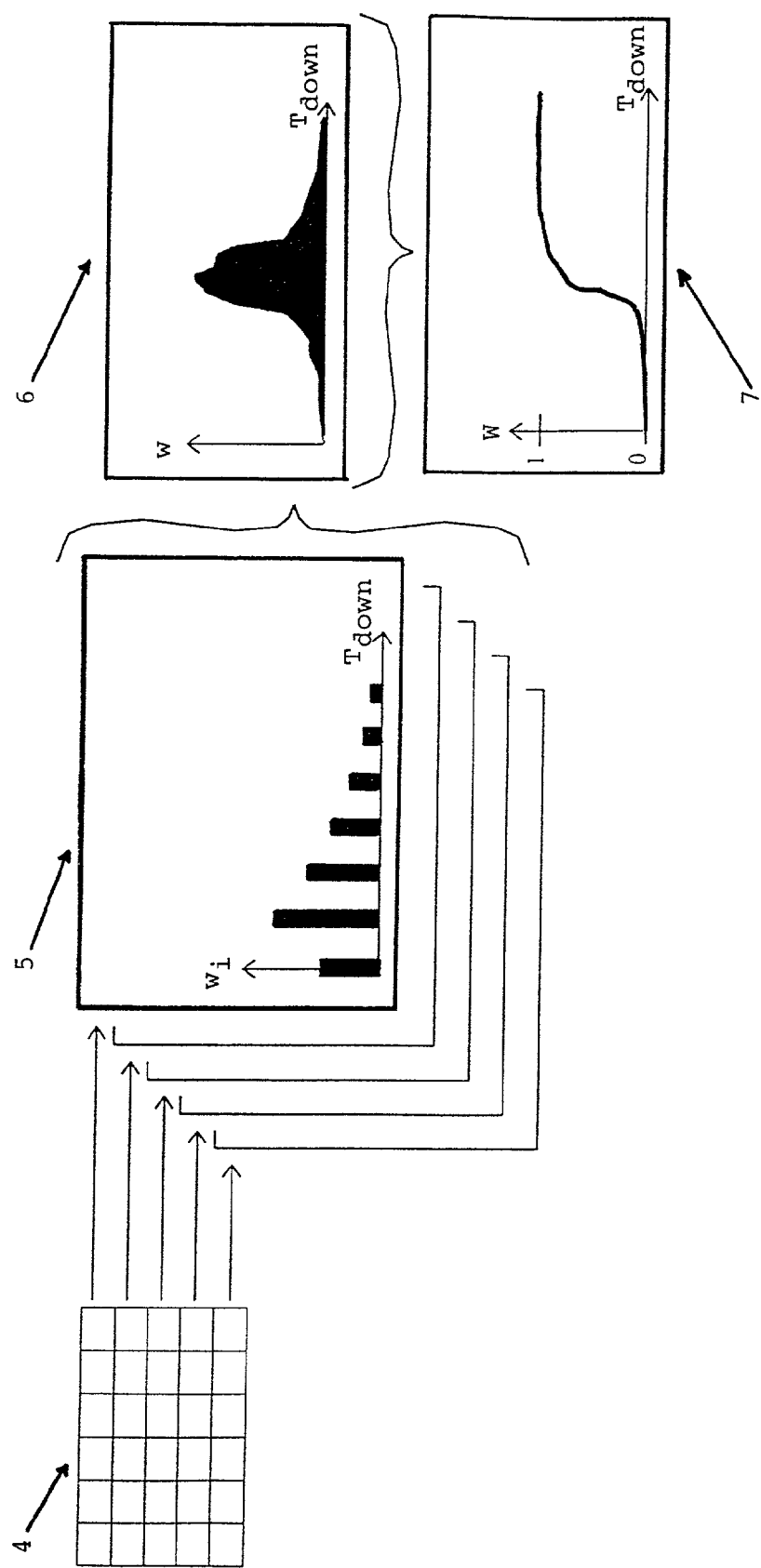
FIG. 2 shows a schematic representation of the calculation according to the invention of the system reliability in conjunction with an FMEA table.

The method is illustrated for the first types of fault in FIG. 2. Widened Poisson distributions $w_i$ are calculated 5 for each row of the FMEA or FMECA table 4 with a first type of fault and convoluted 6 to form an overall probability density distribution W, and an overall probability distribution W is determined 7 by integration. It is also possible to specify the probability distribution 1-W such that the random variable, for example the failure-induced downtime in the prescribable time interval, is greater than $T_{down}$.

This computing method is repeated for each group of second types of fault in order to obtain an upper, lower and, if appropriate, mean overall probability distribution W or 1-W for the system failure risk.

What is claimed is:

1. A computer-implemented method for quantitative estimation of the reliability of a technical system, comprising the steps of:
   specifying the types of faults with associated fault rates for the system components;
   determining a probability distribution of a random variable characterizing the reliability for the overall system and for a prescribable time interval;
   determining first fault rates by statistical random samples of the associated fault rates of the system components;
   estimating second fault rates by subjective expert opinion and an upper and a lower estimate being specified for each of the second fault rates;
   calculating a first limiting probability distribution with the upper estimates and second limiting probability distribution with the lower estimates; and
   using the first and second fault rates and the first limiting probability distribution and second limiting probability distribution to determine an upper and lower limit of the system reliability.

2. The method as claimed in claim 1, wherein
   (a) a mean value is additionally estimated in each case for the second fault rates, and
   (b) a mean probability distribution is calculated with the mean values.

3. The method of claim 2, wherein the mean value is the most probable value.

4. The method as claimed in claim 1, wherein
   (a) random sample mean values are determined for the first fault rates and distribution functions are assumed, and (b) a width or a widening of the associated distribution function is determined from the uncertainty of each random sample mean value.

5. The method as claimed in claim 4, wherein
a) for each of said first fault rates, a Poisson distribution with a nominal expectation value equal to the random sample mean value is assumed,
b) a minimum and a maximum expectation value are calculated from a required confidence level, and
c) a widened Poisson distribution is calculated by weighted summing of the Poisson distributions with the nominal, minimum and maximum expectation values.

6. The method as claimed in claim 5, wherein a confidence level $1-\alpha$ and weighting factors $1-2\alpha$, $\alpha$ and $\alpha$ are selected for the Poisson distributions with the nominal, minimum and maximum expectation values.

7. The method of claim 6, wherein $\alpha=0.1$ is set.

8. The method as claimed in claim 1, wherein third fault rates are taken into account and known a priori or with high statistical reliability, and for which a Poisson distribution is assumed.

9. The method as claimed in claim 8, wherein distribution functions of the first and third fault rates are convoluted, and the first and second limiting probability distributions and a mean probability distribution are calculated by adding the upper, lower and a mean estimate of the second fault rates.

10. The method of claim 9, wherein other non-random variables relevant to the system reliability are determined for the prescribable time interval and added to the first and second probability distributions.

11. The method in accordance with claim 8 in conjunction with FMEA tables, FMECA tables or tables derived from said FMEA tables or FMECA tables, wherein
a) said first, second and third fault rates are distinguished in the FMEA or FMECA tables, or the tables derived therefrom,
b) random sample mean values and confidence intervals are specified for said first fault rates,
c) upper, lower and mean estimates are specified for said second fault rates, and
d) expectation values are specified for said third fault rates.

12. The method as claimed in claim 11, wherein Poisson distributions of the first and third types of fault are calculated and convoluted with one another, and the second fault rates are grouped into upper, lower and mean fault rates and added separately in each case.

13. The method as claimed in claim 1, wherein the random variable characterizing the reliability is based on at least one of a susceptibility to faults, a downtime, costs of standstill, repair and maintenance, or variables derived therefrom.

14. The method of claim 13, wherein the first and second fault rates are failure rates.

* * * * *